United States Patent [19]

Petry

[11] 4,208,958
[45] Jun. 24, 1980

[54] BEVERAGE BREWER HOUSING STRUCTURE

[75] Inventor: Stanton H. Petry, Arlington Heights, Ill.

[73] Assignee: Cory Food Services, Inc., Chicago, Ill.

[21] Appl. No.: 652,568

[22] Filed: Jan. 26, 1976

[51] Int. Cl.² ............................................. A47J 31/00
[52] U.S. Cl. ........................................ 99/300; 99/281
[58] Field of Search .......................... 99/300, 280–281, 99/282–283, 295, 304–305, 306–307, 314–315, 317, 323

[56] References Cited

U.S. PATENT DOCUMENTS

| | | | |
|---|---|---|---|
| 2,826,980 | 3/1958 | Willman | 99/317 |
| 3,291,034 | 12/1966 | Sohn et al. | 99/281 X |
| 3,366,034 | 1/1968 | Karlen et al. | 99/282 |
| 3,385,201 | 5/1968 | Martin | 99/282 |
| 3,405,630 | 10/1968 | Weber | 99/282 |
| 3,425,336 | 2/1969 | Bufkin et al. | 99/281 |
| 3,605,604 | 9/1971 | Diebold et al. | 99/281 |
| 3,619,561 | 11/1971 | Smit | 99/281 X |
| 3,691,932 | 9/1972 | Martin | 99/281 |
| 3,832,526 | 8/1974 | Clausse | 99/281 X |
| 3,844,206 | 10/1974 | Weber | 99/282 |

*Primary Examiner*—Harvey C. Hornsby
*Assistant Examiner*—Arthur O. Henderson
*Attorney, Agent, or Firm*—Wegner, Stellman, McCord, Wiles & Wood

[57] ABSTRACT

A beverage brewer housing structure cooperatively defined by a water heating tank, a portion of a basin overlying the heating tank for receiving poured-in cold water and delivering the water to the heating tank, and a cover overlying the basin. A pour-in drawer may be provided in the cover to be selectively disposable in a retracted disposition within the cover and a pour-in position wherein at least a portion of the drawer is exposed. The cover may be removably secured in the housing structure and in the illustrated embodiment, is secured to the tank.

7 Claims, 5 Drawing Figures

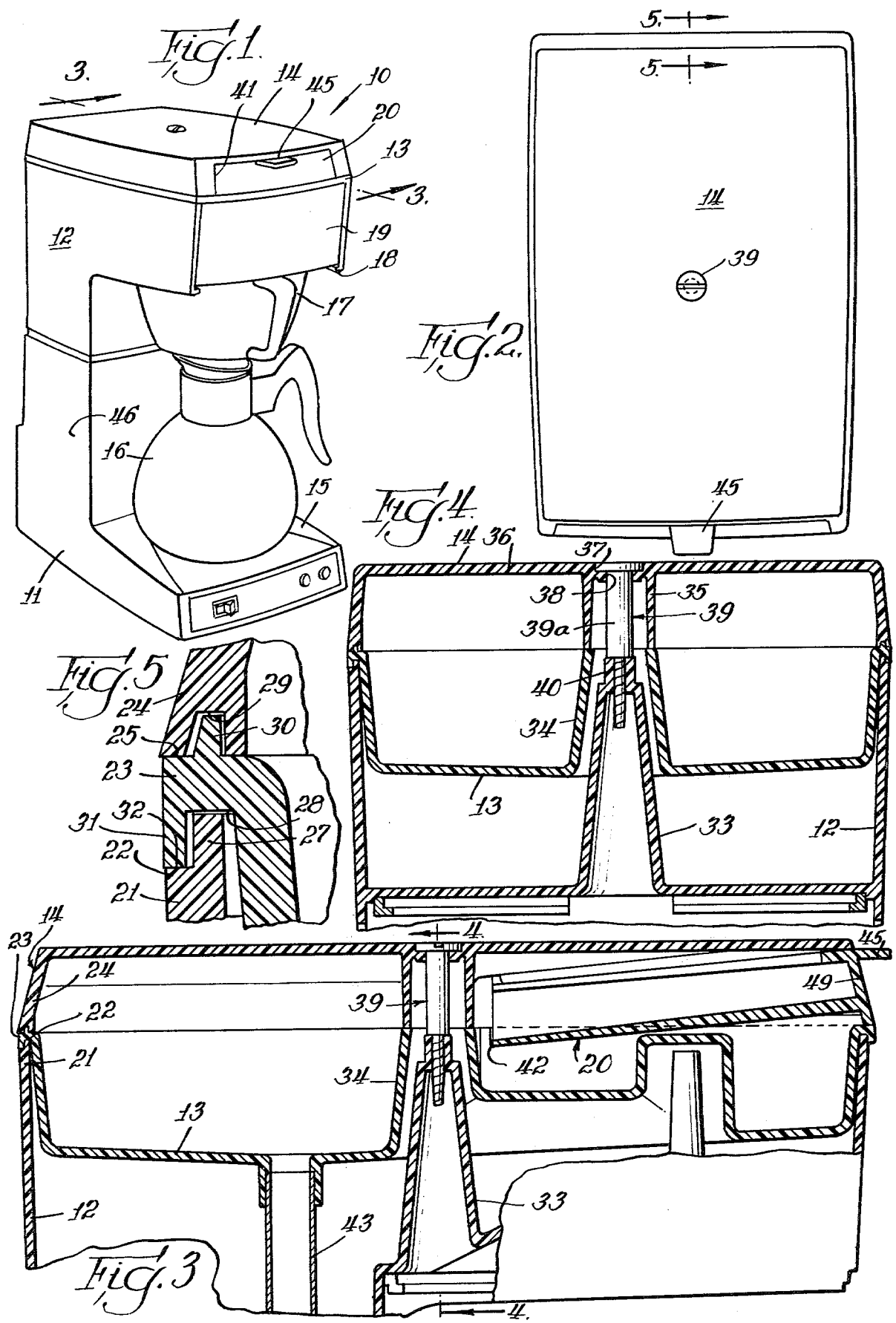

BEVERAGE BREWER HOUSING STRUCTURE

BACKGROUND OF THE INVENTION

1. Field of the Invention

This invention relates to beverage brewers and in particular to housing structures for use in beverage brewers.

2. Description of the Prior Art

In U.S. Pat. No. 3,366,034 of Harvey R. Karlen et al, owned by the assignee hereof, a brewing apparatus is shown to include a hot water heating tank and a cold water basin overlying the tank for conducting cold water into the tank from a selectively positionable drawer. The drawer is movably received in an upper portion of the housing to be selectively disposed in a retracted position overlying the basin within the housing, and in an access position wherein at least a portion of the drawer is disposed forwardly of the housing.

In U.S. Pat. No. 3,385,201 of John C. Martin, a beverage maker is shown to comprise a generally similar arrangement of such a heating tank and basin disposed within an outer housing cabinet. In the Martin structure, the top wall of the cabinet is provided with a perforated portion defining a pour-in opening overlying the basin permitting the cold water to be delivered directly through the opening into the basin, with a closure element being removably installed over the perforated portion when desired.

In U.S. Pat. No. 2,299,053 of Robert G. Ferris, a water heater is shown having a heating tank which is disposed within an insulated casing. A basin is received in an upper portion of the tank. An annular spacer ring formed of plywood is disposed on the top of the insulated housing, and presents its upper surface in flush relationship with the top of the tank. A channel ring is fitted over the plywood ring and is adapted to engage fixedly with the walls of the tank and casing, respectively, adjacent their upper ends. A removable closure cover may be provided in overlying relationship to the basin and insulated casing wall.

In U.S. Pat. No. 2,428,466 of Frederick Palm, a displacement electric water heater is disclosed wherein a hot water tank is disposed within an insulated casing which carries an overlying basin connected to the tank through a conduit extending downwardly through the insulation of the casing to a lower portion of the tank.

Walter R. Lorang, in U.S. Pat. 3,354,810, shows a simplified coffeemaking machine wherein the basin extends upwardly through an outer housing for delivering cold water poured into the basin to a subject heating tank mounted within the housing.

In U.S. Pat. No. 3,589,271 of James H. Tarrant et al, a coffeemaking apparatus is shown having a one-piece container wherein a pour-in basin is disposed within the outer walls of the housing. The container forms a control chamber and a water heating chamber sharing a common wall and an upper wall portion of the container defines a perforated opening selectively closed by a closure for controlling introduction of poured-in cold water to the reservoir.

SUMMARY OF THE INVENTION

The present invention comprehends an improved beverage brewer outer housing structure which is cooperatively defined by a water heating tank, a basin, and a cover.

The water heating tank has a lower base housing wall portion and an upper housing wall portion. The basin overlies the tank and has a peripheral housing wall portion defining an upper continuation of the tank upper housing wall portion. The cover overlies the basin and defines an upper housing wall portion which, in the illustrated embodiment, includes a peripheral vertical wall portion extending outwardly from the basin peripheral housing wall portion.

The basin peripheral housing wall portion may be substantially flush with the tank upper housing wall portion.

The tank upper housing wall portion and basin peripheral housing wall portion may be provided with cooperating tongue and groove interlock means. Similarly, the cover and basin peripheral wall portion may be provided with cooperating tongue and groove interlock means.

The basin peripheral wall portion may include a down-turned outer flange outwardly overlying the upper end of the tank upper housing wall portion.

In the illustrated embodiment, the cover is secured in the beverage brewer so as to clamp the basin peripheral housing wall portion between the cover and tank upper housing wall portion.

Securing means may be provided extending downwardly through the basin to secure the cover removably to the tank.

In the illustrated embodiment, each of the tank, basin and cover is formed of synthetic resin material.

Thus, the outer housing structure of the beverage brewer of the present invention is extremely simple and economical of construction while yet providing the highly desirable advantages discussed above.

BRIEF DESCRIPTION OF THE DRAWINGS

Other features and advantages of the invention will be apparent from the following description taken in connection with the accompanying drawing wherein:

FIG. 1 is a perspective view of a beverage brewer having an outer housing structure embodying the invention;

FIG. 2 is a top plan view thereof;

FIG. 3 is a fragmentary enlarged longitudinal section of the upper portion thereof taken substantially along the line 3—3 of FIG. 1;

FIG. 4 is a transverse vertical section taken substantially along the line 4—4 of FIG. 3; and FIG. 5 is a fragmentary enlarged vertical section illustrating the arrangement of the housing structure at the juncture of the tank, basin and cover portions.

DESCRIPTION OF THE PREFERRED EMBODIMENT

In the exemplary embodiment of the invention as disclosed in the drawing, a beverage brewer generally designated 10 is shown to comprise a base 11 carrying a hot water tank 12, a basin 13, and a cover 14. The base further is provided with a warmer unit 15 for carrying a decanter 16 subjacent a brewing cartridge 17 removably installed on suitable slides 18 of a cantilevered portion 19 of the tank. Cold water is poured into the brewer by means of a drawer 20 which is selectively received within cover 14 in a retracted position, as shown in FIG. 1, and which may be slidably withdrawn to a partially exposed access position at the front of the beverage brewer for facilitated pouring in of cold water as from the decanter 16 to initiate a brewing operation.

The present invention is concerned with the provision of an outer housing structure which is cooperatively defined by the hot water tank, the basin and the cover.

As best seen in FIG. 3, the peripheral upper tank wall portion 21 defines a top edge portion 22 supporting a peripheral housing wall portion 23 of the basin. As shown in FIG. 5, the basin wall portion 23 defines a substantially flush upwardly continuing outer housing wall.

Cover 14 includes a depending sidewall 24 which, as shown in FIG. 5, rests on an upper surface portion 25 of the basin peripheral wall portion 23.

As best seen in FIG. 5, tank wall portion 22 and basin wall portion 23 cooperatively define tongue and groove means for laterally interlocking the basin relative to the tank. In the illustrated embodiment, the tank may be provided with an upstanding tongue 27 and the basin may be provided with a downwardly opening groove 28 adapted to receive the tongue.

Similarly, cover wall portion 24 may be provided with a downwardly opening groove 29 and the basin may be provided with an upstanding tongue 30 received in groove 29 for interlocking the cover against lateral displacement relative to the basin.

The basin wall portion 23 may define a downturned outer flange 31 adapted to rest on an upper surface 32 of the tank wall portion 22 outwardly of tongue 27.

In the illustrated embodiment, cover 14 is removably secured in the brewer. As best seen in FIGS. 3 and 4, tank 12 may be provided with an upstanding post 33 extending upwardly to within a frustoconical wall 34 on the basin. Cover 14 includes a downturned tubular flange 35 extending downwardly to the upper end of the frustoconical wall 34. The top wall 36 of cover 14 is provided with a recess portion 37 having a central opening 38 and an elongated screw 39 carrying a cylindrical bushing 39a is extended downwardly through opening 38 to have a lower threaded portion threaded to a connector portion 40 at the upper end of the post 33. Thus, the screw 39 causes the cover wall portion 24 to clamp the basin peripheral wall portion 23 against the upper end of the tank wall portion 22 to define a readily separable yet fixedly secured outer housing structure of the beverage brewer.

In the illustrated embodiment, the cover 14 is provided with a front opening 41 through which the drawer 20 is selectively movable between a retracted position overlying the basin 13, as shown in FIG. 3, and a partially withdrawn position wherein the front portion of the drawer is exposed for receiving poured-in cold water as from decanter 16. The poured-in cold water effects a delivery of the previously heated water from tank 12 by flowing down over the rear portion 42 of the drawer into basin 13 and downwardly from the basin through an inlet tube 43 to the lower portion of tank 12.

The front wall 44 of the drawer 20 comprises an upright wall which effectively closes opening 41 in the retracted position of the drawer, as seen in FIG. 1. A forwardly projecting handle 45 may be formed integrally on the front wall 44 of the drawer to facilitate manipulation of the drawer between the retracted and access positions.

In the illustrated embodiment, the housing wall portions of the tank, basin and cover may be formed of molded synthetic resin. As best seen in FIG. 1, the tank 12 may comprise an upward extension of an upright portion 46 of the base stand 11.

In the illustrated embodiment, grooves 28 and 29 have a horizontal width greater than the horizontal extent of the tongues 27 and 30, respectively, for facilitated fit of the basin to the tank and the cover to the basin while yet providing the desirable lateral interlocking functioning discussed above.

The foregoing disclosure of specific embodiments is illustrated of the broad inventive concept comprehended by the invention.

I claim:

1. In a beverage brewer wherein water is heated to brew a beverage, an outer housing structure comprising: a water heating tank having a lower wall portion defining a lower portion of said outer housing structure, said heating tank further having an upper wall portion defining a midportion of said outer housing structure and provided with an upwardly projecting tongue; a base supporting the tank lower portion; a basin overlying said tank for receiving poured-in cold water and delivering the cold water downwardly into the tank to be heated therein, said basin having a peripheral wall portion defining an upward continuation of said tank upper wall portion defining an upper portion of said outer housing structure and having a downwardly opening groove receiving said tank tongue, and an upwardly projecting tongue; a basin cover overlying said basin and having a sidewall defining an upward continuation of said basin peripheral portion and defining an uppermost portion of said outer housing structure, said cover sidewall defining a downwardly opening groove receiving said basin tongue, said base, tank, basin, and basin cover cooperatively defining substantially a complete outer housing of the beverage brewer whereby the basin and basin cover are retained against lateral displacement relative to the tank by said cooperating tongues and grooves; and means for releasably securing the tank, basin, and basin cover in assembled relationship.

2. The beverage brewer of claim 1 wherein said cover includes a peripheral wall portion defining a substantial upward continuation of said basin peripheral wall portion.

3. The beverage brewer of claim 1 wherein said basin peripheral wall portion is outwardly substantially flush with said tank upper and cover sidewall wall portion.

4. The beverage brewer of claim 1 wherein said last named means comprises means removably securing said basin cover to said tank.

5. The beverage brewer of claim 1 wherein said last named means comprises means for drawing said cover toward said tank upper wall portion to clamp said basin peripheral wall portion therebetween.

6. The beverage brewer of claim 1 wherein said cover defines an opening for passing cold poured-in water to said basin, and closure means for selectively closing said opening and defining a movable portion of the outer housing of the beverage brewer.

7. The beverage brewer of claim 1 wherein each of said tank, basin, and cover is formed of synthetic resin material.

* * * * *